No. 795,321. PATENTED JULY 25, 1905.
C. H. WALKER.
POTATO LOADER.
APPLICATION FILED DEC. 3, 1904.
2 SHEETS—SHEET 1.
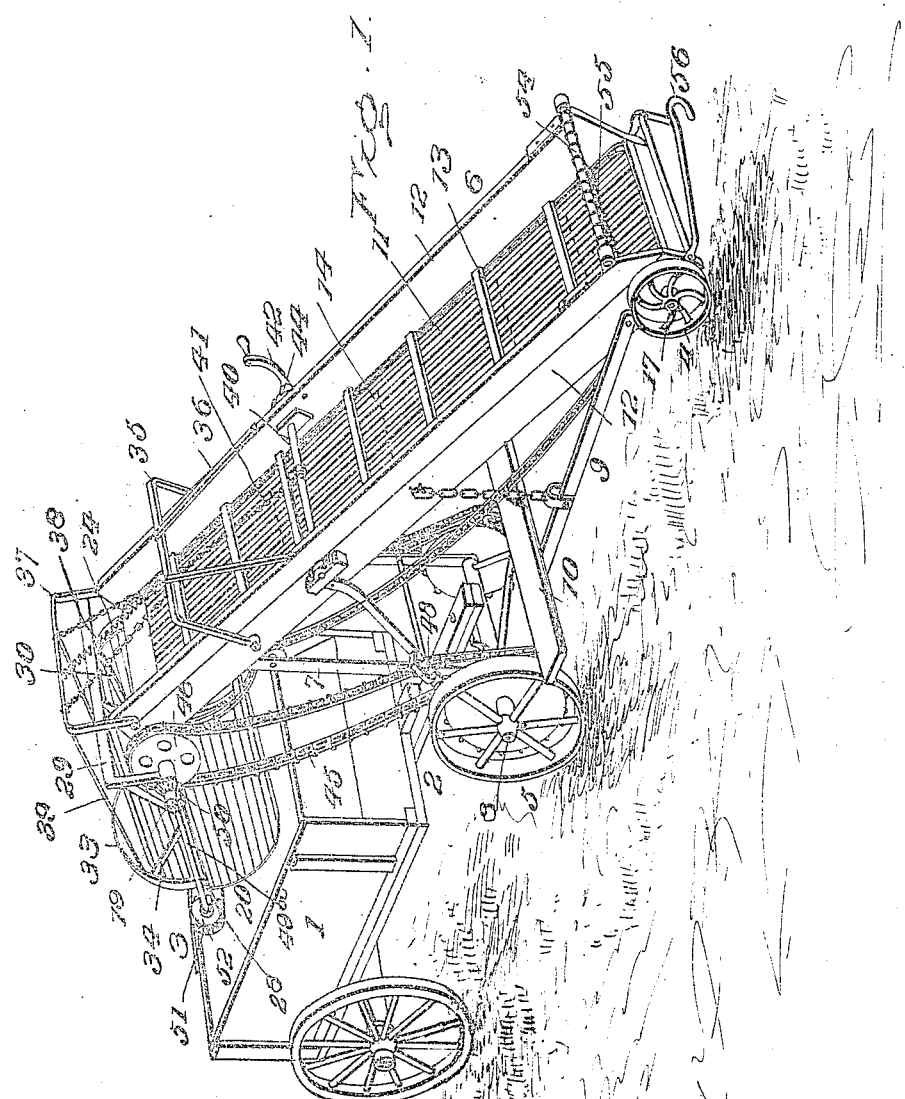

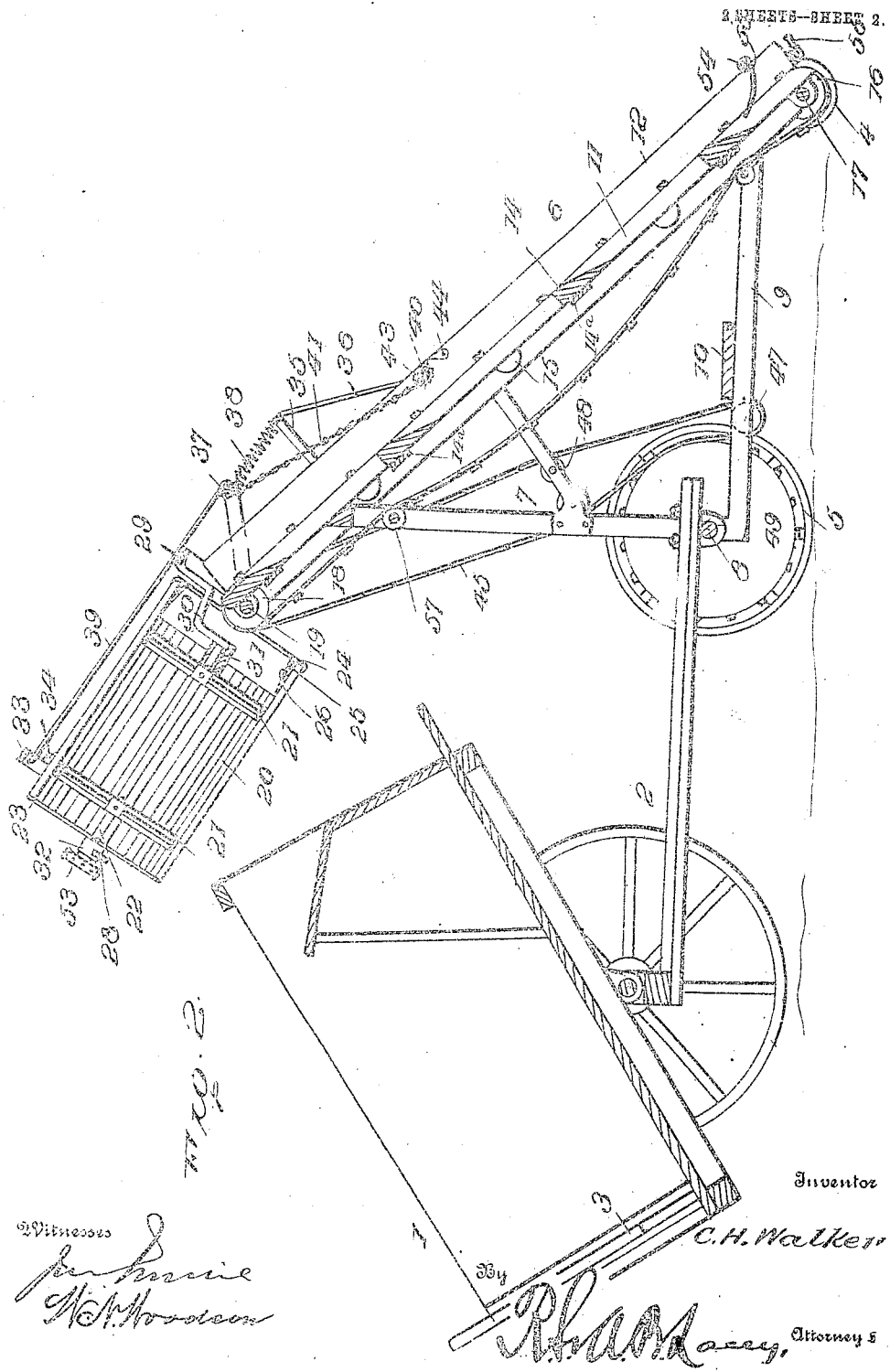

UNITED STATES PATENT OFFICE.

CHARLES HOWARD WALKER, OF NORTHWOOD, IOWA.

POTATO-LOADER.

No. 795,321.　　Specification of Letters Patent.　　Patented July 25, 1905.

Application filed December 3, 1904. Serial No. 235,380.

*To all whom it may concern:*

Be it known that I, CHARLES HOWARD WALKER, a citizen of the United States, residing at Northwood, in the county of Worth and State of Iowa, have invented certain new and useful Improvements in Potato-Loaders, of which the following is a specification.

The purpose of this invention is to provide an attachment for use in connection with any form or type of potato-digger for loading the tubers into a wagon or other receptacle, thereby obviating any intermediate or subsequent handling for this purpose. The loading attachment or elevator is of such construction as to get rid of all earth and other foreign matter that may become detached from the potatoes during their passage from the digger into the wagon or receptacle.

The primary object of the invention is to materially lessen the cost of harvesting potatoes and like tubers and to provide a mechanism which will operate effectively in connection with any kind of digging machinery and which will be of light draft and easy of management, so as not to require additional help.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a loader embodying the invention. Fig. 2 is a central longitudinal section of the loader, on a larger scale, showing the chute elevated and the wagon or receptacle tilted.

Corresponding and like parts are referred to in the following description and indicated in both views of the drawings by the same reference characters.

The loader is adapted to be coupled to any type of digger, so as to receive the potatoes or tubers therefrom, and is arranged to deliver the potatoes into a receptacle 1 of any construction and suitably arranged to receive the tubers from the elevating mechanism. As shown in the drawings, the receptacle 1 consists of a wagon-body tiltingly mounted upon a truck 2 and provided at its rear end with a gate 3 to admit of the potatoes being discharged into a measure, basket, or the like when the part 1 is tilted, as indicated in Fig. 2. The truck 2 may be of any make or design and is hitched to the loader so as to move therewith over the field.

The loader is mounted upon front wheels 4 and rear wheels 5, the latter constituting drivers from which power is delivered for operating the moving parts of the elevator and chute. The elevator 6 is upwardly and rearwardly inclined and is supported at its front end upon the axle connecting the wheels 4 and at its rear end upon standards 7, mounted upon the rear axle 8, provided with the drive-wheels 5. Reaches 9 connect the lower portion of the elevator with the lower ends of the standards 7 and support a platform 10, upon which the attendant may stand when the machine is in operation. The elevator comprises a slatted bottom 11, side pieces 12, and an endless carrier 13, the latter consisting of side chains and lags or cross-pieces. The slats are separated by spacers 14, which are of wedge form, the taper being on the upper side, as indicated most clearly in Fig. 2, so as to prevent objects dropping between the slats and moved over the slatted bottom catching on the cross-bars 14ª, connecting the said slats. Idlers 15 are journaled to the inner faces of the side pieces 12 and support the chains of the endless carrier 13. The lower end of the endless carrier 13 is supported upon sprocket-wheels 16, loosely mounted upon the axle 17, provided with the front wheels 4, and is supported at its upper end by means of corresponding sprocket-wheels 18, fast with a transverse shaft 19, journaled in bearings at the upper end of the elevator-frame. The power for operating the elevator is applied to the shaft 19 and is derived from the drive-wheels 5, the means for transmitting the power being of any type that may be determined upon, according to the cost and construction of the machine.

A chute 20 is provided at the delivery end of the elevator and is of cylindrical form and is mounted to have rotary movement imparted thereto to insure thorough cleaning of the potatoes or tubers before delivery into the receptacle 1. The rotation of the chute 20 imparts a tumbling movement to the potatoes, whereby any earth or other matter adhering thereto is loosened and detached and finally escapes through the openings or spaces in the sides of the chute. In the preferable construction the chute is formed of strips or slats spaced apart and attached to supports 21, each consisting of a hub, rim, and spokes and fast upon a shaft 22. A ring 23 is attached to the rear ends of the strips or slats and forms a guard to prevent the ends of the slats catching any object and, further, serving to hold the slats in proper position. A ring 24 is attached to the front ends of the slats or strips for a purpose similar to the ring 23 and is wider than the ring 23, so as to overlap the outer ends of wedges 25 and a band 26, arranged upon the inner side of the chute at its receiving end. The wedges 25 are secured upon the inner sides of the slats or strips and support the band 26, which results in contracting the upper or receiving end of the chute, so as to prevent any of the tubers escaping from the upper end of the chute when the machine is in service.

A frame 28 of approximately U form is mounted upon the shaft 19, so as to have a free pivotal movement thereon. A bow or arch 29 has its side members connected to the side bars of the frame 28 about in line with the shaft 19 and is provided with a bracket or hanger 30, which enters the upper or receiving end of the chute 20 and is provided with a bearing 31, in which is journaled the upper end of the shaft 22, the opposite end of said shaft being mounted in a bearing 32, applied to the outer cross-bar of the frame 28. A bow or arch 33 is connected to the side bars of the frame 28 and is arranged near the outer or delivery end of the chute. The two arches 29 and 33 are stayed by suitable braces 34. An arch or bow 35 is attached to the elevator-frame near its upper end and is strengthened by braces 36. An arch or bow 37 is pivotally connected to the upper end of the elevator-frame, and a counterbalanced spring 38 connects its upper portion with the upper portion of the arch 35 and is of such strength as to sustain the weight of the chute and adjunctive parts, whereby adjustment thereof to the required inclination is greatly facilitated. Connecting means 39 are interposed between the bows 33 and 37 and may consist of rods, chains, or analogous means. A pivotal movement of the bow or arch 37 results in a corresponding movement of the chute 20, whereby its inclination may be varied at will to cause the tubers to pass therethrough more or less rapidly. A shaft 40, journaled transversely of the elevator-frame, is connected to the bow or arch 37 by means of a chain 41 or like means, and this shaft is adapted to be turned by a crank 42 and is held in an adjusted position by a ratchet-wheel 43 and coöperating pawl 44. The connection 39 between the bows 33 and 37 equalizes the strain upon the framework of the rotary chute.

While it is contemplated within the purview of the invention to interpose gearing of any type between the drive-wheels 5 and the shaft 19, nevertheless for the sake of simplicity a drive-chain 45 is employed and passes around a sprocket-wheel 46, fast upon one end of the shaft 19, and around an idler 47, journaled to the reach 9, and is supported intermediate of its ends by idlers 48. It is to be understood that a drive-chain 45 is arranged upon each side of the machine, and the parts 46, 47, and 48 are duplicated. Each drive-wheel 5 is journaled with a sprocket-rim 49, which engages with a portion of the drive-chain 45, so as to impart motion thereto, as indicated most clearly in Figs. 1 and 2. It is to be understood that the drive-wheels 5 are loose upon the axle 8 and that a shipper mechanism is employed for throwing the drive mechanism into and out of gear. A longitudinal shaft 49ª is located at one side of the rotary chute and is journaled in bearings attached to a side bar of the frame 28. The upper end of the shaft 49 is in gear with the shaft 19 by bevel-gearing 50, and the opposite end is connected to the shaft 22 by means of a sprocket-chain 51, supported at its ends by means of sprocket-wheels 52 and 53, fast upon the outer or lower ends of the respective shafts 49 and 22.

A rod or bar 54 extends transversely of the lower end of the elevator-frame, and a series of retainers 55 are pivotally mounted thereon and rest lightly at their lower ends upon the slatted bottom 11 of the elevator. The retainers 55 support the tubers intermediate of the lags, flights, or buckets of the carrier, thereby preventing them from dropping upon the ground. The retainers 55 are inclined to the plane of the elevator and are adapted to move upward to admit of the lags or crosspieces of the carrier passing under them in their upward movement over the slatted bottom 11.

A draft-hook 56 or like contrivance is provided at the front end of the leader for coupling it to the digger. (Not shown.) As the machine is drawn or otherwise impelled over the field the tubers raised by the digger are discharged upon the lower end of the elevator and are carried upward thereby to the chute 20, and directed thereby into the receptacle 1. The earth or foreign matter loosened from the tubers in their passage over the slatted bottom 11 escapes through the spaces or openings formed in said bottom, and any earth or other matter adhering to the tubers when received in the chute is loosened and detached by the tumbling and striking of the tubers incident to the rotation of the chute, the space or openings thereof providing for escape of said foreign matter. By inclining the chute more or less the tubers may be retained in the chute for a greater or less length of time, as will be readily understood. The inclination of the chute may be regulated by turning the shaft 40 in one direction or the other. When it is required to dump the tubers from the receptacle 1, the chute is elevated and the receptacle 1 tilted, substantially as indicated in Fig. 2. To prevent the upper portion of the lower run of the endless carrier coming in contact with the lower side of the upper portion of the chute, the chains pass over guide-pulleys 57, attached to the standards 7 near their upper ends.

Having thus described the invention, what is claimed as new is—

1. In combination, an elevator, a delivery-chute pivoted thereto, a pivoted arch, connecting means between said arch and chute, a counterbalance applied to said arch, and means for varying the inclination of the chute.

2. In combination, an elevator, a chute pivoted thereto, an arch pivoted to the elevator-frame, a counterbalance for the chute connected to the pivoted arch, connecting means between the latter and chute, and adjusting means coöperating with the pivoted arch for varying the inclination of the chute.

3. In combination, an elevator, a chute pivoted thereto an arch applied to the outer end of the chute, a companion arch rigidly connected to the elevator-frame, a third arch pivoted to the elevator-frame at a point between the aforesaid arches, connecting means between the pivoted arch and the arch at the rear end of the chute, a counterbalance between said pivoted arch and the rigid arch of the elevator, and adjusting means coöperating with the pivoted arch for varying the inclination of the chute.

4. In combination, an elevator, a pivoted frame, a rotary chute journaled at one end to a cross-bar of said frame, an arch at the opposite end of the pivoted frame pivotally mounted upon the elevator-frame in line with the axis of said pivoted frame, a hanger pendent from said arch and provided at its lower end with a bearing to form a journal for the opposite end of the chute, a counterbalance for the chute, and adjusting means between the chute and elevator-frame.

In testimony whereof I affix my signature in presence of two witnesses.

CHARLES HOWARD WALKER. [L. S.]

Witnesses:
T. L. RINGHAM,
FRANK FORBES.